US009554502B2

(12) United States Patent
Madsen et al.

(10) Patent No.: US 9,554,502 B2
(45) Date of Patent: Jan. 31, 2017

(54) SEED COATING COMPOSITIONS AND METHODS FOR APPLYING SOIL SURFACTANTS TO WATER-REPELLENT SOIL

(75) Inventors: Matthew D. Madsen, Burns, OR (US); Steven Petersen, Springville, UT (US); Alan G. Taylor, Geneva, NY (US)

(73) Assignees: Cornell University, Ithaca, NY (US); Brigham Young University, Provo, UT (US)

( * ) Notice: Subject to any disclaimer, the term of this patent is extended or adjusted under 35 U.S.C. 154(b) by 0 days.

(21) Appl. No.: 12/730,182

(22) Filed: Mar. 23, 2010

(65) Prior Publication Data
US 2010/0267554 A1    Oct. 21, 2010

Related U.S. Application Data

(60) Provisional application No. 61/210,868, filed on Mar. 23, 2009.

(51) Int. Cl.
*A01N 25/26* (2006.01)
*A01C 1/06* (2006.01)

(52) U.S. Cl.
CPC ...................................... *A01C 1/06* (2013.01)

(58) Field of Classification Search
CPC ........................................................ A01C 1/06
USPC ............................................ 47/57.6; 504/100
See application file for complete search history.

(56) References Cited

U.S. PATENT DOCUMENTS

| | | | |
|---|---|---|---|
| 4,729,190 A | 3/1988 | Lee | |
| 4,735,015 A | 4/1988 | Schmolka | |
| 5,525,131 A | 6/1996 | Asano | |
| 5,527,760 A * | 6/1996 | Rensing et al. | 504/100 |
| 5,623,781 A | 4/1997 | Legro | |
| 5,849,320 A * | 12/1998 | Turnblad et al. | 424/410 |
| 6,199,318 B1 * | 3/2001 | Stewart et al. | 47/57.6 |
| 6,884,754 B1 | 4/2005 | Schlatter et al. | |
| 7,213,367 B2 | 5/2007 | Wertz et al. | |
| 2002/0188042 A1 * | 12/2002 | Haile | 524/47 |
| 2003/0115793 A1 | 6/2003 | Kostka | |
| 2004/0077498 A1 * | 4/2004 | Lynch | 504/100 |
| 2004/0220056 A1 | 11/2004 | Glenn | |
| 2006/0042530 A1 | 3/2006 | Bodycomb | |
| 2007/0207927 A1 * | 9/2007 | Rosa et al. | 504/100 |
| 2009/0093365 A1 * | 4/2009 | Walsh | A01N 25/26 504/100 |

FOREIGN PATENT DOCUMENTS

| | | |
|---|---|---|
| JP | 54-085909 | 7/1979 |
| JP | 03-0333182 A | 2/1991 |
| JP | 08-149907 | 6/1996 |
| JP | 08-157819 | 6/1996 |
| JP | 09-233913 | 9/1997 |
| JP | 2001000012 | 1/2001 |
| WO | 03031535 A1 | 4/2003 |
| WO | 03031536 A1 | 4/2003 |
| WO | 2006024333 A2 | 3/2006 |
| WO | 2007003319 A2 | 1/2007 |
| WO | 2008091597 A1 | 7/2008 |

OTHER PUBLICATIONS

Kaufman (Paramount Seeds Inc., article taken from HortTechnology Oct.-Dec. 1991. vol. 1 No. 1. pp. 98-102, published online on Aug. 3, 2004 www.paramountseed.com).*
Kostka, Stanley J., Louise W. Dekker, et al. Surfactants as management tools for ameliorating soil water repellency in turfgrass systems. Proceedings of the 8th International Symposium on Adjuvants for Agrochemicals (ISAA2007). Publisher: International Society for Agrochemical Adjuvants, Columbus, Ohio, USA. Aug. 6-9, 2007.
Romme, W.H. Historical and modern disturbance regimes, stand structures, and landscape dynamics in pinon-juniper vegetation of the Western United States. Rangeland Ecology and Management 2009 62:203-222.
Miller, R.F. Development of post settlement pinon-juniper woodlands in the Intermountain West: a regional perspective. USDA Forest Service, Research Paper Report 2008 RMRS-RP-69.
Briske, D.D. A unified framework for assessment and application of ecological thresholds. Rangeland Ecology and Management 2005 59:225-236.
Young, J.A. Population dynamics after wildfires in sagebrush grasslands. Journal of Range Management 1978 31:283-289.
Thompson, T.W. Fire rehabilitation using native and introduced species: A Landscape Trial. Rangeland Ecology and Management 2006 59:237-248.
Madsen, M.D. Influence of soil water repellency on post-fire revegetation success and management techniques to improve establishment of desired species. 2010. Dissertation, Brigham Young University, Provo, UT.
Osborn, J.F. Soil wettability as a factor in erodibility. Soil Science Society of America Proceedings 28:294-295.
Kostka, S.J. Amelioration of water repellency in highly managed soils and the enhancement of turfgrass performance through the systematic application of surfactants. Journal of Hydrology 2000 231-232:359-368.

(Continued)

Primary Examiner — Janet Epps-Smith
Assistant Examiner — Courtney Brown
(74) *Attorney, Agent, or Firm* — Ohlandt, Greeley, Ruggiero & Perle, L.L.P.

(57) ABSTRACT

Herein provided are innovative methods and techniques for improving seedling germination and plant establishment including a seed composition of at least one seed having a seed protective coating applied to the seed and a soil surfactant coating applied to the seed protective coating. The seed protective coating is positioned between the seed and the soil surfactant. The seed protective coating is formulated to keep the soil surfactant from contacting the seed and the soil surfactant coating is formulated to increase wettability of soil and being a sufficient quantity of soil surfactant to treat the soil in contact with the seed composition such that the soil is conditioned for growing the seed.

10 Claims, 7 Drawing Sheets

(56) References Cited

OTHER PUBLICATIONS

PCT/US2010/028371, International Search Report and Written Opinion, International Filing Date: Mar. 19, 2010.
European Search Report dated Dec. 8, 2014 from corresponding EP Application No. 10756739.8 (PCT/US2010/028371), 5 pages.
Chinese Third Office Action from corresponding Chinese Application No. 201080022722.7 dated Feb. 28, 2015, 7 pages.
Chinese Notification of Fourth Office Action dated Sep. 15, 2015 from corresponding Chinese Application No. 201080022722.7 with English translation, 6 pages.
Canadian Office Action dated Dec. 18, 2015 from corresponding Canadian Patent Application No. 2,756,352, 4 pages.

* cited by examiner

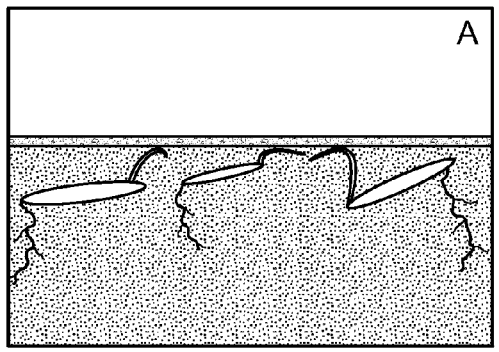 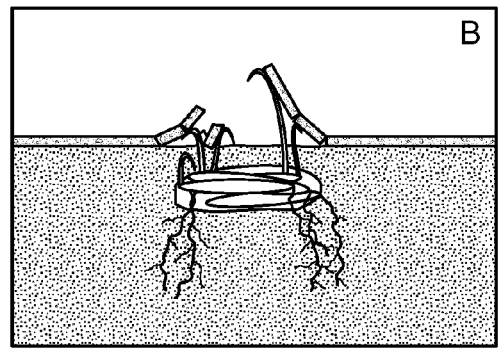
FIG. 4A  FIG. 4B
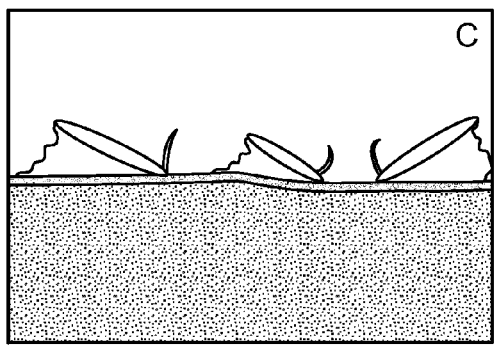 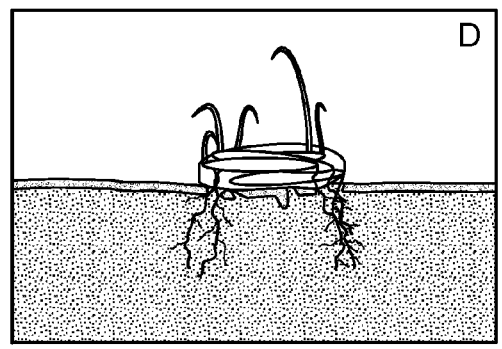
FIG. 4C  FIG. 4D

SEED COATING COMPOSITIONS AND METHODS FOR APPLYING SOIL SURFACTANTS TO WATER-REPELLENT SOIL

CROSS REFERENCE TO RELATED APPLICATION

This application claims the benefit under 35 U.S.C. §119(e) of U.S. Provisional Patent Application No. 61/210,868, filed Mar. 23, 2009, which is incorporated, in its entirety, by this reference.

STATEMENT REGARDING FEDERAL FUNDING

The U.S. Government has a paid-up license in this invention and the right in limited circumstances to require the patent owner to license others on reasonable terms as provided for by the terms of (contract No. or Grant No.) awarded by (Agency).

BACKGROUND OF THE INVENTION

1. Field of the Invention

The present invention relates generally to improvements in seed and seed-related products, processes for making such products, and processes for establishing and improving seed beds. This invention is also directed at improving seed establishment on post-fire water-repellent soil.

2. Background Art

Effective reseeding efforts are important for establishing desirable plant species on agricultural, rangeland, forested land, urbanized areas (i.e. turf), and dry spots. However, these efforts are often encountered with specific problems that include the development of hydrophobic soil layers that prevent effective seed germination and plant establishment. For example, in the western United States, the widespread expansion and stand infilling by piñon (*Pinus*) and juniper (*Juniperus*) (P-J) species into grassland and sagebrush communities constitutes one of the greatest modern-day afforestations. Since European settlement of the Western U.S., P-J species have expanded their range to more than 40 million hectares (Romme, W. H., C. D. Allen, J. D. Bailey, W. L. Baker, B. T. Bestelmeyer, P. M. Brown, K. S. Eisenhart, M. L. Floyd, D. W. Huffman, B. F. Jacobs, R. F. Miller, E. H. Muldavin. T. W. Swetnam, R. J. Tausch, and P. J. Weisberg. 2009. Historical and modern disturbance regimes, stand structures, and landscape dynamics in pinon-juniper vegetation of the Western United States. Rangeland Ecology and Management 62:203-222). This ecosystem shift has resulted in negative impacts to soil resources, plant community structure and composition, forage quality and quantity, water and nutrient cycles, wildlife habitat, and ecological biodiversity. As P-J woodlands mature, increased fuel loads and canopy cover can lead to large-scale, high intensity crown-fires (Miller, R. F., R. J. Tausch, D. Macarthur, D. D. Johnson, S. C. Sanderson. 2008. Development of post settlement pifion-juniper woodlands in the Intermountain West: a regional perspective. USDA Forest Service, Research Paper Report RMRS-Rp-69). After a fire, the ability of desirable plant communities to recover depends on the extent to which physical and biological processes controlling ecosystem function have been altered, both prior to and as result of the fire (Briske, D. D., S. D. Fuhlendorf, and F. E. Smeins. 2005. A unified framework for assessment and application of ecological thresholds. Rangeland Ecology and Management 59:225-236).

Like P-J woodlands, these cultivated and wildlands may experience similar alterations to both physical and biological structure and process. Reseeding techniques are needed that increase plant establishment, in particular when associated with altered soil properties such as hydrophobic layers. In the case of P-J forests, low seed establishment in hydrophobic soils can lead to undesirable ecological thresholds. When this threshold is crossed, the recovery of desirable species may not be possible without direct human intervention. If sites remain disturbed and unvegetation for a year or more, sites can transition into a secondary state of weed dominance, which then promotes more frequent fire return intervals and decreased native plant establishment, further impairing vital ecosystem function (Young, J. A., and R. A. Evans. 1978. Population dynamics after wildfires in sagebrush grasslands. Journal of Range Management 31:283-289).

Restoring desired species, recovering natural processes, and preventing movement toward undesirable thresholds is accomplished with the successful establishment of desirable vegetation. In the past, land managers have typically selected introduced species such as crested wheatgrass (*Agropyron cristatum* (L.) Gaertn.) and forage kochia (*Bassia prostrata* (L.) A. J. Scott). These species often have more consistent establishment, lower costs, better weed competition, and improved livestock forage quality. Currently, many federal and state organizations are increasing the use of native plant materials in place of introduced species in an effort to reinstate ecosystem processes and improve species diversity (Thompson, T. W., B. A. Roundy, E. D. McArthur, B. D. Jessop, B. Waldron, J. N. Davis. 2006. Fire rehabilitation using native and introduced species: A Landscape Trial. Rangeland Ecology and Management 59:237-248), however, these species are costly and establishment success is typically less than desirable. Therefore, the use of native species in reseeding efforts typically increases project costs while decreasing the likelihood of successfully-establishing a functional community. These issues reduce the desire of land managers to include native plant materials in rehabilitation projects.

To improve the success of reseeding efforts, several mechanical and non-mechanical treatments have been proposed with varying degrees of effectiveness. For example, aerial reseeding followed by anchor chaining is commonly practiced for post-fire rehabilitation of P-J woodlands. Although this form of mechanical treatment has been shown to be successful in many situations, the additional disturbance may increase risk of soil erosion by wind and water. Furthermore, economic, cultural, and topographic constraints (i.e. soils are too rocky or steep) prevent the use of this mechanical treatment on a significant portion of the landscape.

When restoration practices fail, ecological resilience is compromised, and soil loss, weed invasion, and other factors act as triggers that initiate feedback shifts that carry a site across ecological thresholds to undesirable alternate stable states. Land managers throughout the Intermountain West are calling for new techniques that improve establishment of native plant materials to restore habitats and to prevent subsequent weed dominance.

In order to develop successful restoration approaches, it is critical that the mechanisms which impair vegetation establishment or recovery and the conditions that develop prior to disturbance which lead to crossing ecological thresholds are understood. If the state of an individual site is known in relation to ecological thresholds and possible transitions to other states, capital can be correctly allocated to sites in transition, in order to promote the system's natural ability to recover. Furthermore, an understanding of the mechanisms that prevent recovery will allow the development of resilience-based approaches that promote recovery of ecosystem process and function (Briske, D. D., S. D. Fuhlendorf, and F. E. Smeins. 2005. A unified framework for assessment and application of ecological thresholds. Rangeland Ecology and Management 59:225-236).

Hydrophobicity, or soil water repellency, is one factor that may significantly limit recovery of plant communities and enhance weed dominance within P-J dominated systems after fire. Soil water repellency is commonly found in arid and semi-arid ecosystems. Post-fire patterns of soil water repellency have been shown to be highly correlated with decreased soil water content, infiltration, and revegetation success (Madsen, M. D. 2010. Influence of soil water repellency on post-fire revegetation success and management techniques to improve establishment of desired species. Dissertation, Brigham Young University, Provo, Utah). We hypothesize that post-fire WR acts as a temporal ecological threshold by impairing establishment of desired species within the first few years after a fire, which then leaves resources available for weed invasion after WR has diminished. Better knowledge of WR in P-J ecosystems is necessary to guide management actions as these woodlands continue to encroach, infill, and mature throughout their adaptable range (Miller et al. 2008).

Restoration approaches which focus on ameliorating WR could potentially improve the success of native plant materials following reseeding efforts while simultaneously decreasing runoff and soil erosion, and preventing weed domination. Use of commercially available surface active agents (wetting-agents or surfactants) may provide an alternative restoration approach where WR inhibits site recovery. A wide variety of ionic and nonionic wetting-agents are produced commercially, ranging from simple dish soaps to sophisticated polymers chemically engineered to overcome WR. Wetting-agents are generally organic molecules that are amphiphilic (hydrophobic tails and hydrophilic heads). While wetting agents have different modes of action, in the case of soil applications the hydrophobic tail of the wetting-agent chemically bonds to the non-polar water repellent coating on the soil particle, while the hydrophilic head of the molecule attracts water molecules, thus rendering the soil wettable.

Small plot, post-fire research projects, located in the mountains of southern California, have shown that the application of wetting-agents after a fire can reduce soil erosion and improve vegetation establishment (Osborn, J. F., R. E. Pelishek, J. S. Krammes, and J. Letey. Soil wettability as a factor in erodibility. Soil Science Society of America Proceedings 28:294-295). These studies suggest that wetting-agent applications can be a successful post-fire treatment. While wetting-agents have not been used in wildland systems since the 1970's, they have been extensively used and further developed within various aspects of the agricultural industry, with most applications in turf grass systems (Kostka, S. J. 2000. Amelioration of water repellency in highly managed soils and the enhancement of turfgrass performance through the systematic application of surfactants. Journal of Hydrology 231-232:359-368). Subsequently, the effectiveness of these chemicals in overcoming soil WR has been improved. The development of these wetting-agents may provide an innovative approach for alleviating the effects of WR on germination and establishment of native vegetation species, thus allowing them to better compete with invasive annual weed species such as cheatgrass (*Bromus tectorum* L.).

The primary objectives of this research were to quantify within a glasshouse setting: 1) the extent that soil water repellency influences emergence and growth of the non-native bunchgrass crested wheatgrass (*Agropyron cristatum* (L.) Gaertn., and native bunchgrass, bluebunch wheatgrass (*Pseudoroegneria spicata* (Pursh) A. Löve), both of which are commonly seeded for fire rehabilitation, in the Intermountain West, USA; and 2) determine the effects of the newly developed non-ionic wetting-agent "Soil Penetrant" (Aquatrols Inc., Paulsboro, N.J.) on WR and seedling growth to assess its potential use in wildfire rehabilitation of P-J ecosystems.

Water Repellence in Relation to Fire.

After a fire, the ability of ecosystem to recover is dependent on the extent to which ecological processes have been altered. Modification of the soil through the development of a hydrophobic layer is one alteration which can significantly limit site recovery. Wildland vegetation can create a hydrophobic layer in the first few centimeters of the soil profile.

During a fire, heat can volatilize organic substances within the litter and upper hydrophobic soil layers. These volatilized compounds then move downward into the soil, condensing within the cool underlying soil layers. This results in a wettable layer at the soil surface and an intensified hydrophobic zone a few centimeters below the soil surface. The development or enhancement of this hydrophobic layer has severe implications for revegetation success, runoff, and soil erosion. Seeds which germinate within the soils upper wettable layer typically desiccate, as a result of the water repellent layer disconnecting the seedling from the underlying soil moisture reserves (FIG. 2). The lack of seedling establishment allows for continued soil erosion and provides the opportunity for invasion of annual weeds in subsequent years, when sown seeds are no longer viable.

The arrangement of a wettable soil layer overlying a water repellent layer also has severe implications for water runoff and soil stability. During a rainfall event the upper wettable layer is quickly saturated due to the underlying water repellent layer impeding infiltration. On steep slopes, when this wettable layer becomes saturated from high intensity rainfall events, water, soil, and debris can quickly flow down slope, which causes site degradation and property damage if it is within the wildland urban interface.

Large amounts of public funds are spent each year on postfire rehabilitation treatments. Currently, post-fire rehabilitation treatments include providing immediately surface cover by straw mulching, hydromulching and other methods. However, these methods are expensive; for example straw mulching has been shown to range between $1000 per hectare and $3000 per hectare and hydromulching can range between $2350 per hectare to $4700 per hectare. Consequently, applying such strategies can be almost impractical at large scales. Thus, there is currently a need for effective postfire rehabilitation treatments which can be applied at the landscape scale which ameliorate the influence of hydrophobic soil and establish desirable plants back into the system.

Use of commercially available soil surfactants may provide an alternative postfire restoration approach where hydrophobicity and limited soil moisture availability are preventing site recovery. Soil surfactant molecules are hydrophobic on one end and hydrophilic on the other end. Upon entering the soil the hydrophobic end of the soil surfactant chemically attaches to the non-'polar water repellent coating on the soil particle; while the hydrophilic end of the agent is able to attract water molecules allowing soil moisture to be absorbed in the upper hydrophobic soil layers.

Various small plot postfire research projects located in the chaparral mountains of southern California have shown that the application of soil surfactants after a fire can reduce soil erosion and improve vegetation establishment. These studies suggest that the application of soil surfactants can be a successful postfire treatment. While soil surfactants have not been used in wildland systems since the 1970's, they have been extensively used and further developed in various aspects of the agricultural industry, with particular use in turf production. Subsequently, the effectiveness of these chemicals in diminishing soil hydrophobicity has been improved. The development of these soil surfactant products may provide an innovative approach for alleviating the effects of hydrophobicity on runoff and soil erosion, and allow native vegetation species, the ability to better compete with invasive annual weed species such as cheatgrass (Bromus tectorum). While these results are promising, application of soil amendments is typically not practical for the revegetation of wildland systems, due to the large areas and low economic value of the land to be treated. Commercially available soil surfactant products are particularly costly. Furthermore, the application of these chemicals to a wildland landscape is difficult at best.

SUMMARY OF THE INVENTION

Preferred embodiments include compositions with at least one seed and at least one coating, which is a wetting agent. Other coatings can be added as other embodiments. Various wetting agents can be used to treat hydrophobic soil (or even increase moisture in nonhydrophobic soils). In a preferred embodiment of the invention, wetting agents are attached or coated to a seed and then the coated seed is delivered to the hydrophobic patch of soil. Once the wetting agents are released, then the wetting agents can treat the area of hydrophobic soil that is surrounding the seed. Alternatively, the hydrophobic layer can be penetrated by the wetting agents, and the seeds that have been delivered to that spot can then germinate and penetrate. The invention also contemplates agglomerates, which are two or more seeds that have been coated into a single agglomerate. Some advantages of using an agglomerate include: multiple seeds are delivered to a site, and the agglomerate also carries wetting agents and other amendments (plant or soil amendments) so that land with a hydrophobic layer can be treated. In one aspect and embodiment of the invention, the wetting agents are amphipilic and contain hydrophobe portions and hydrophile portions. The hydrophobe portions of the wetting agent allow the wetting agent to be attracted to the hydrophobic soil, and the hydrophile portions of the wetting agent facilitate the accumulation of water around the wetting agent.

In some embodiments, the wetting agent is one or more one nonionic surfactants; in other embodiments the invention has at least one nonionic surfactant is selected from the group consisting of copolymers, block copolymers, alcohol ethoxylates, nonylphenol ethoxylates, ethylene oxide/propylene oxide block copolymers, and alkylpolyglycosides.

Other embodiments comprise a soil amendment or plant amendment selected from the group consisting of 2-butoxyethanol, alkylpolyglycosideamino acids, ammonium laureth sulfate, bio-stimulants, block co-polymers, blended non-ionic, ionic surfactants, enzymes, ethylene oxide/propylene oxide, fermentation products, fulvic acid, granular soil surfactants, hormones, humic acid, liquid soil surfactants, microorganisms, nonylphenolpolyethoxylate, nontoxic ingredients, non-ionic surfactants, nutrients, oleic acid, surfactants, soil conditioners, soil microbes, microbial innoculants, stimulants that are beneficial to microbial growth, soil surfactants, super-hydrating soil surfactants, tackifiers, turf soil surfactants, penetrants, poloxanlene, re-soil surfactants, root stimulants, spreaders, vitamins, agrichemical seed treatments, fungicide, insecticides, plant protectants, and absorbent polymers.

Other embodiments have at least one carrier is selected from the group consisting of transition powders, blends of montmorillonite, oil absorbents, a blend containing about 65% of −325 RVM (or, alternatively, sorbent mineral powders such as montmorillonite, attapulgite or diatomite) and about 35% powdered limestone or other powder carrier by volume, montmorillonite clay, potato starch, molecular sieves, diatomaceous earth, talc, mica, lime, and bentonite.

Other preferred embodiments have an agglomerate of more than one seed, wherein said at least one wetting agent is at least one ingredient that is selected from the group consisting of ionic surfactants, nonionic surfactants, amphiphilic surfactants, and surfactants with an hydrophilic-lipophilic balance (HLB) value greater than 2 and less than 18.

Other preferred embodiments have at least one of the following coatings selected from the group consisting of tackifiers, slurry tackifiers, and psyllium tackifier.

Other preferred embodiments have less than fifty seeds, and wherein said at least one tackifier is selected from the group consisting of mulch tackifiers, tackifier slurries, and psyllium tackifier.

A preferred embodiment contains a method for preparing a composition, comprising:
  providing at least one seed,
  providing at least one wetting agent, and
  coating said at least one seed with said at least one wetting agent.

Other embodiments of the method also have steps for forming an agglomerate of more than one seed by coating said at least one seed with a hydrophilic powder, coating said at least one seed with an adhesive while simultaneously witholding said hydrophilic powder from said seed, aggregating at least one developing agglomerate of more than one seed, and adding said hydrophilic powder to said developing agglomerate wherein a completed agglomerate of more than one seed is formed.

Other embodiments of the method include said at least one seed is greater than one seed and less than fifty seeds, and wherein an amount of said wetting agent is greater than 3% w/w but less than 2500% w/w.

Other embodiments of the method include the steps of coating said composition with at least one the following coatings selected from the group consisting of at least one seed protectant layer, at least one binder, at least one carrier, at least one tackifier, at least one outer coating, at least one hydrophobic coating, at least one nutrient, at least one soil stimulant, at least one seed stimulant, at least one plant stimulant, at least one bio-stimulant, and at least one microorganism.

A preferred embodiment of the invention is a method for ameliorating water repellent soil and increasing water availability in wetable soil, comprising the steps of providing at least one seed, wherein said at least one seed comprises at least one seed and at least one wetting agent, said at least one wetting agent comprising at least one hydrophobic group and at least one hydrophilic group.

Another embodiment of the invention includes allowing said at least one seed to lay in said soil, exposing said seed capsule to water, releasing said wetting agent from said seed capsule, and improving moisture availability to the area surrounding the at least one seed.

In another embodiment of the invention, the said capsule is an agglomerate of more than one seed.

BRIEF DESCRIPTION OF THE DRAWINGS

FIG. 1D, 1E, 1F, 1G, AND 1H show cross sections of yet other preferred embodiments.

FIG. 4A shows some cotyledons that have penetrated the soil crust layer to a limited degree and the seeds have died.

FIG. 4B shows cotyledons from multiple seeds that have conglomerated into a single pellet, and the single pellet of multiple seeds collectively generates sufficient force to penetrate through the soil crust layer.

FIG. 4C shows non-coated seeds which have germinated at or near the soil surface. The radicals have not fully-penetrated the soil crust layer. The non-coated seeds are elevated and have been pushed along the soil surface as the radical grows. Without radical penetration into the soil the seedlings have quickly desiccated. FIG. 4D shows a conglomerate seed capsule that has greater mass then a non-conglomerate seed capsule and tackifiers that are present as a layer in the conglomerate seed capsule anchors or glues the seed to the soil surface once the soil surface has become wet. By attaching the seed to the soil necessary leverage is provided for the radical to penetrate into the soil, thus increasing seedling survival.

EXPLANATION OF THE NUMBERING IN THE FIGURES

Figure 1A:
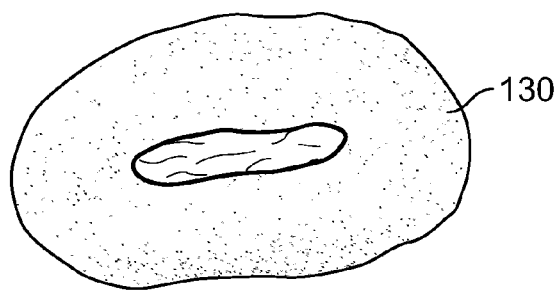
FIG. 1A shows a cross section of a preferred embodiment and depicts a seed that has been coated with a wetting agent. The invention contemplates the coating of a single seed and also the coating of multiple seeds, which is herein called an agglomerate.
Figure 1B:
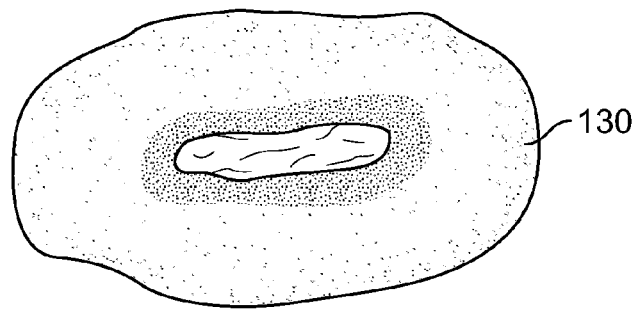
FIG. 1B shows cross sections of another preferred embodiments of the invention.
Figure 1C:
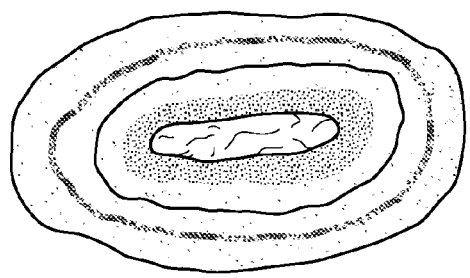
FIGS. 1C and 1D show an embodiment having a single seed with four coatings. The depiction of two seeds is to show that there are many ways that a seed could be coated with multiple coats. Tackifiers are generally found on the outside coat, however it is not required by the invention that tackifiers be on the outside coat. Also, the invention is not limited to only four coats but encompasses a large amount of coatings.
Figure 1D:
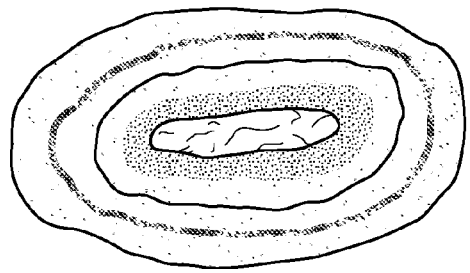
Figure 1E:
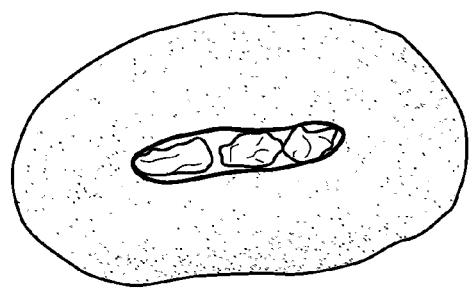
Figure 1F:
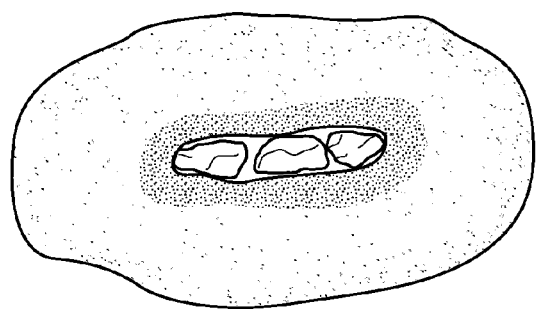
Figure 1G:
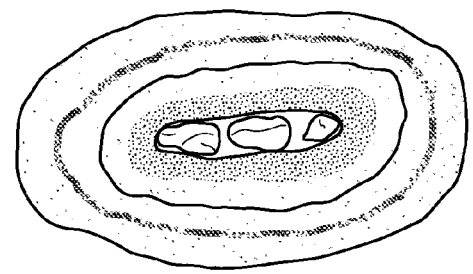
Figure 1H:
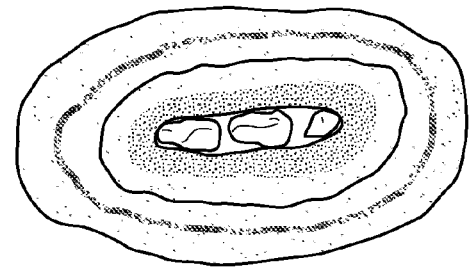

100: the water repellent layer (also known as a hydrophobic layer)
110: the upper wettable layer also known as topsoil
120: lower wettable layer
130: wetting agents, also known as soil surfactants
150: hydrophilic conduit

DETAILED DESCRIPTION OF THE INVENTION

Preferred embodiments of the invention encompass a method for making a composition which can be utilized for treating seed, the composition, and methods for using the composition. For purposes of the present description the term "seed" is not limited to a particular type of seed and can refer to seed from a single plant species, a mixture of seed from multiple plant species, or a seed blend from various strains within a plant species. The described compositions can be utilized to treat gymnosperm seed, dicotyledonous angiosperm seed and monocotyledonous angiosperm seed. Compositions according to the present invention can be particularly useful for treatment of seed and seeds which will be utilized in applications including but not limited to home gardening, crop production, forestry applications, turf, golf courses, and government rehabilitation programs.

Units, prefixes, and symbols may be denoted in their SI accepted form. Numeric ranges recited herein are inclusive of the numbers defining the range and include and are supportive of each integer within the defined range. Unless otherwise noted, the terms "a" or "an" are to be construed as meaning "at least one of". The section headings used herein are for organizational purposes only and are not to be construed as limiting the subject matter described. All documents, or portions of documents, cited in this application, including but not limited to patents, patent applications, articles, books, and treatises, are herein expressly incorporated by reference in their entirety for any purpose.

The foregoing techniques and procedures are generally performed according to conventional methods well known in the arts of botany and forestry.

The following definitions are given by way of example and not as limitations. As utilized in accordance with the present disclosure, the following terms, unless otherwise indicated, shall be understood to have the following meanings:

DEFINITIONS

Binders are also known as adhesives. Some nonlimiting examples of binders include: adhesive polymers that may be natural or synthetic and preferably do not phytotoxically effect the seed to be coated. In one embodiment, the binder may be a molasses, granulated sugar, alginates, karaya gum, jaguar gum, tragacanth gum, polysaccharide gum, mucilage or combination thereof. In another embodiment, the binder may be selected from polyvinyl acetates, polyvinyl acetate copolymers, polyvinyl alcohols, polyvinyl alcohol copolymers, celluloses, including ethylcelluloses and methylcelluloses, hydroxymethyl celluloses, hydroxypropylcelluloses, hydroxymethylpropyl-celluloses, polyvinylpyrolidones, dextrins, malto-dextrins, polysaccharides, fats, oils, proteins, gum arabics, shellacs, vinylidene chloride, vinylidene chloride copolymers, calcium lignosulfonates, acrylic copolymers, starches, polyvinylacrylates, zeins, gelatin, carboxymethylcellulose, chitosan, polyethylene oxide, acrylimide polymers and copolymers, polyhydroxyethyl acrylate, methylacrylimide monomers, alginate, ethylcellulose, polychloroprene and syrups or mixtures thereof; polymers and copolymers of vinyl acetate, methyl cellulose, vinylidene chloride, acrylic, cellulose, polyvinylpyrrolidone and polysaccharide; polymers and copolymers of vinylidene chloride and vinyl acetate-ethylene copolymers; combinations of polyvinyl alcohol and sucrose; plasticizers such as glycerol, propylene glycol, polyglycols. The plasticizer, when added, comprises from about 0.5% to 10% w/w of the binder.

Soil surfactants are also known as wetting agents; some examples of soil surfactants are: 2-butoxyethanol, alkylpolyglycosideamino acids, ammonium laureth sulfate, B-complex vitamins, bio-catalysts, bio-stimulants, block co-polymers, blended non-ionic, ionic surfactants, enzymes, ethylene oxide/propylene oxide, fermentation products, fulvic acid, granular soil surfactants, hormones, humic acid, liquid soil surfactants, microorganisms, nonylphenolpolyethoxylate, nontoxic ingredients, non-ionic surfactants, nutrients, oleic acid, surfactants, soil conditioners, soil surfactants, super-hydrating soil surfactants, turf soil surfactants, penetrants, poloxanlene, re-soil surfactants, root stimulants, spreaders, and vitamins.

Compositions according to the present invention can comprise one or more macronutrients. For purposes of the present description, the term "macronutrient" can refer to an element for plant growth which is utilized by plants in proportionally larger amounts relative to micronutrients. For most plant species and for purposes of the present description, macronutrients include nitrogen, potassium, phosphorus, calcium, magnesium and sulfur. Compositions of the present invention can include various combinations and relative amounts of individual macronutrients. Preferably, compositions include both phosphorous and potassium. In particular embodiments, compositions of the present invention include each of the listed macronutrients.

An aspect of the invention include agglomerates. Techniques which group multiple seeds together into a conglomerate (pellets with 3-5 seeds) help concentrate a large amount of surfactant within a small area to ameliorate the hydrophobic layer and also help glue/anchor the seed to the soil surface once it gets wet. A limiting factor for rangeland areal reseeding efforts is that the seeds which germinate at or near the soil surface have poor radical penetration, with the seeds being elevated or pushed along the soil surface as the radical grows. Without radical penetration into the soil the seedlings quickly desiccate. A major benefit to anchoring the seed to the soil is that it provides the leverage necessary for the radical to penetrate into the soil, thus increasing seedling survival . . . . Clumping/pelting seeds together may also promote seedling survival where seeds that are buried below the soil surface (such as through drill seeding) are limited by a physical crust. By clumping multiple seeds together the cotyledons collectively generate sufficient force to penetrate through the physical crust.

A variety of materials are available to provide macronutrients to the composition. Exemplary substances which may be utilized to provide nitrogen include ammonium sulfate, ammonium nitrate, fish protein digest, ammonium phosphate sulfate, phosphate nitrate, diammonium phosphate, ammoniated single superphosphate, ammoniated triple superphosphate, nitric phosphates, ammonium chloride, calcium nitrate, calcium cyanamide, sodium nitrate, urea, urea-ammonium nitrate solution, nitrate of soda potash, potassium nitrate, amino acids, proteins, nucleic acids and combinations thereof. Commercially available fish protein digests that can be utilized in compositions of the invention include, for example, SEA-PROD™ (Soil Spray Aid, Inc., Moses Lake, Wash.); MERMAID™ (Integrated Fertility Management (IFM), Wenatchee, Wash.); and OCEAN HARVEST™ (Algro Farms, Selah, Wash.).

Exemplary phosphate materials that can be utilized include mono-potassium phosphate, superphosphate (single/double or triple), phosphoric acid, ammonium phosphate sulfate, ammonium phosphate nitrate, diammonium phosphate, ammoniated superphosphate (single, double or triple), nitric phosphates, potassium pyrophosphates, sodium pyrophosphate, nucleic acid phosphates, and combinations thereof.

Exemplary potassium materials which can be utilized include mono-potassium phosphate, potassium chloride, potassium sulfate, potassium gluconate, sulfate of potash magnesia, potassium carbonate, potassium acetate, potassium citrate, potassium hydroxide, potassium manganate, potassium molybdate, potassium thiosulfate, potassium zinc sulfate, and combinations thereof.

Calcium containing materials that can be utilized in compositions of the invention include, but are not limited to, powdered milk, calcium ammonium nitrate, calcium nitrate, calcium cyanamide, calcium acetate, calcium acetylsalicylate, calcium borate, calcium borogluconate, calcium carbonate, calcium chloride, calcium citrate, calcium ferrous citrate, calcium glycerophosphate, calcium lactate, calcium oxide, calcium pantothenate, calcium propionate, calcium saccharate, calcium sulfate, calcium tartrate, and mixtures thereof.

Exemplary magnesium materials for utilization in compositions of the present invention include magnesium sulfate, magnesium oxide, dolomite, magnesium acetate, magnesium benzoate, magnesium bisulfate, magnesium borate, magnesium chloride, magnesium citrate, magnesium nitrate, magnesium phosphate, magnesium salicylate, and combinations thereof.

Exemplary sulfur containing materials for utilization in the compositions include magnesium sulfate, ammonium phosphate sulfate; calcium sulfate, potassium sulfate, sulfuric acid, cobalt sulfate, copper sulfate, ferric sulfate, ferrous sulfate, sulfur, cysteine, methionine, and combinations thereof.

Compositions of the present invention can comprise one or more micronutrients. For purposes of the present invention the term "micronutrients" refers to an element utilized by plants during growth which are used in smaller amounts relative to macronutrients. Typically, and for purposes of the present description, plant micronutrients include iron, manganese, zinc, copper, boron, molybdenum and cobalt. Numerous compounds and substances are available to provide micronutrients to compositions of the present invention. Exemplary zinc containing compounds include chelated zinc, zinc sulfate, zinc oxide, zinc acetate, zinc benzoate, zinc chloride, zinc bis(dimethyldithiocarbamate), zinc citrate, zinc nitrate, zinc salicylate, and combinations thereof.

Exemplary iron containing materials which can be utilized in compositions of the present invention include chelated iron, ferric chloride, ferric citrate, ferric fructose, ferric glycerophosphate, ferric nitrate, ferric oxide, ferrous chloride, ferrous citrate, ferrous fumarate, ferrous gluconate, and ferrous succinate, and combinations thereof.

Exemplary manganese containing materials which can be utilized include manganese sulfate, manganese acetate, manganese chloride, manganese nitrate, manganese phosphate, and combinations thereof.

Exemplary cobalt materials which can be utilized in compositions of the present invention include cyanocobalamin, cobaltic acetate, cobaltous chloride, cobaltous oxalate, cobaltous potassium sulfate, cobaltous sulfate, and combinations thereof.

Various combinations and relative amounts of micronutrients can be utilized in the compositions of the present invention. Preferably, compositions include at least zinc, iron and manganese, and in particular embodiments the compositions comprises at least zinc, iron, manganese and cobalt.

The presence and amounts of individual macronutrients and micronutrients in a particular composition can vary depending on factors such as the condition of the soil from which the seed was produced and the soil conditions existing where the seed will be planted. For example, if a seed is to be planted in an area that is known to be deficient in one or more macronutrients or micronutrients, the corresponding macronutrients and micronutrients can be provided in the composition in amounts sufficient to partially or completely compensate for such deficiency. A deficiency in one or more nutrients can also occur within a seed when such seed has been produced under conditions where the soil is deficient in those nutrients. When such intra-seed deficiency exists, the corresponding macronutrients and micronutrients in which the seed is deficient can be provided within compositions of the invention, in amounts sufficient to partially or completely compensate for such deficiency.

It is not unusual for the soil conditions from whence seed originated to be unknown. Additionally, a seed supply can contain seed originating from numerous locations. Further, it may be unknown at the time of treating seed where the particular seed will be planted. Accordingly, it can be advantageous to provide individual macronutrients and micronutrients to the composition in an amount sufficient to alleviate potential deficiencies. It can be most preferred to provide all the listed micronutrients and macronutrients in the composition with each present in an amount sufficient to at least partially compensate for any deficiency in the corresponding nutrient, whether the deficiency occurs in the soil from whence the seed originated or in the soil into which the seed will be planted. Conversely, if soil conditions are known to be such that any individual nutrient is present in abundance, and that supplemental amounts will not further benefit the seed, such nutrient can be omitted from the composition.

Compositions of the present invention can further contain any of a number of vitamins and cofactors important for plant germination and growth. For purposes of the present description the term "cofactor" can be referred to as a metal ion cofactor, a coenzyme or a coenzyme precursor. Exemplary vitamins and cofactors for utilization in compositions of the present invention include thiamine, riboflavin, niacin (nicotinic acid and/or niacinamide), pyridoxine, panthenol, cyanocobalamin, citric acid, folic acid, biotin and combinations thereof. Preferably, compositions of the present invention comprise each of folic acid, biotin, panthenol (and/or panthothenic acid), riboflavin and thiamine. More preferably, the composition can comprise some form of each of the listed vitamins and cofactors.

The listed vitamins and cofactors can be provided in the composition in any form including vitamin derivatives and provitamin forms. Optionally, one or more alcohols can be utilized in the composition to enhance the activity and aid in the preservation of one or more vitamins. An exemplary alcohol which may be utilized is benzyl alcohol.

Exemplary forms of thiamine which can be utilized in compositions of the present invention include thiamine hydrochloride, thiamine pyrophosphate, thiamine monophosphate, thiamine disulfide, thiamine mononitrate, thiamine phosphoric acid ester chloride, thiamine phosphoric acid ester phosphate salt, thiamine 1,5 salt, thiamine triphosphoric acid ester, thiamine triphosphoric acid salt, yeast, yeast extract, and various combinations thereof.

Exemplary forms of riboflavin for utilization in compositions of the present invention include riboflavin, riboflavin acetyl phosphate, flavin adenine dinucleotide, flavin adenine mononucleotide, riboflavin phosphate, yeast, yeast extract and combinations thereof.

Niacin materials which can be comprised by compositions of the present invention include but are not limited to niacinamide, nicotinic acid, nicotinic acid adenine dinucleotide, nicotinic acid amide, nicotinic acid benzyl ester, nicotinic acid monoethanolamine salt, yeast, yeast extract, nicotinic acid hydrazide, nicotinic acid hydroxyamate, nicotinic acid-N-(hydroxymethyl)amide, nicotinic acid methyl ester, nicotinic acid mononucleotide, nicotinic acid nitrite and combinations thereof.

Pyridoxine and substances which can be utilized in compositions of the invention include pyridoxine hydrochloride, pyridoxal phosphate, yeast and yeast extract. Folic acid materials that can be utilized for compositions of the present invention include but are not limited to folic acid, yeast, yeast extract and folinic acid.

Biotin compounds and materials which can be utilized in compositions of the present invention include biotin, biotin sulfoxide, yeast, yeast extract, biotin 4-amidobenzoic acid, biotin amidocaproate N-hydroxysuccinimide ester, biotinyl 6-aminoquinoline, biotin hydrazide, biotin methyl ester, d-biotin-N-hydroxysuccinimide ester, biotin-maleimide, d-biotin p-nitrophenyl ester, biotin propranolol, 5-(N-biotinyl)-3-aminoallyl)-uridine 5'-triphosphate, biotinylated urddine 5'-triphosphate, N-e-biotinyl-lysine, and combinations thereof.

Panthothenic acid materials for utilization in the compositions can include yeast, yeast extract and coenzyme A. Exemplary cyanocobalamin materials include but are not limited to yeast and yeast extract.

Compositions of the present invention can comprise seaweed extract to provide one or more growth regulators and various amino acids, to the composition. Growth regulators provided by the seaweed extract can include cytokinins, auxins, and gibberellins. It can be advantageous to provide seaweed extract to the composition to supply growth regulators and amino acids in a single source. It is to be understood however that the invention contemplates utilization of multiple sources to provide the various growth regulators and amino acids. Individual amino acids which can be added independently or in combination include alanine, arginine, aspartic acid, cysteine, glycine, glutamic acid, histidine, isoleucine, leucine, lysine, methionine, phenylalanine, proline, serine, tryptophan, tyrosine and valine.

Various seaweed extracts are commercially available which can be utilized in compositions of the present invention. Either cold or hot processed seaweed extract can be utilized. Exemplary commercially available seaweed extracts which can be utilized in compositions of the present invention include ACADIAN™, produced by Acadian Sea Plants Limited, Dartmouth, Nova Scotia, Canada; MAXI- CROP®, produced by Maxicrop International Limited, Corby Northamptonshire, UK; and ALGEA® produced by Algea A.S., Oslo, Norway.

Formulations encompassed by the present invention can comprise a variety of plant extracts. Exemplary extracts include cayenne pepper, lemon extract, garlic extract and peppermint oil. Alternatively, these ingredients can be included in the composition in powdered form. The addition of one or a combination of the listed plant extracts can advantageously inhibit various pests such as birds, rodents and insects without detrimental effects on the seed. The inclusion of one or more of these pest inhibitors can be particularly advantageous when techniques such as aerial planting are utilized where seed is distributed without drilling the soil or covering the seed. Additionally, plant extracts such as garlic extract can inhibit molding. Extracts such as lemon extract and citric acid can function as penetrants, and peppermint and lemon can confer a more pleasant odor to the resulting formulation.

A water absorbant can be included in compositions of the present invention. Numerous absorbants are available for utilization in compositions of the present invention. Exemplary absorbants include various starches and starch copolymers. Particular compositions can comprise a starch-acrylate copolymer, such as starch potassium acrylate copolymer.

A penetrant can be included in compositions of the present invention. Numerous penetrants are available for utilization including, but not limited to, dimethylsulfoxide (DMSO). Because of their ability to act as penetrants, lemon extract and citric acid can be utilized as penetrants in the composition, and can optionally be utilized in combination with one or more additional penetrants.

Compositions of the present invention can optionally comprise one or more mold inhibitors. Numerous mold inhibitors are available for utilization in compositions of the present invention. Preferably, a mold inhibitor can comprise one or more of a dimethylhydantoin derivative and nipicide (o-benzyl-p-chlorophenol). It can be advantageous to utilize dimethylhydantoin, nipicide or mixtures thereof due to the relatively low toxicity of these compounds as compared to alternative mold inhibitors. In particular embodiments, it can be preferable to utilize dimethylhydantoin in an absence of nipicide due to nipicide's unpleasant odor.

Compositions of the present invention can additionally comprise various carbohydrates. Exemplary carbohydrates include algin acid, mannitol and laminarin, each of which is present in seaweed extract. It is to be understood that the compositions of the present invention encompass utilization of other carbohydrates which can be present independently or in combination with the carbohydrates provided by the seaweed extract.

Compositions of the present invention can further comprise at least one of humic acid and fulvic acid. In particular compositions, humic acid can preferably be included to chelate trace elements and thereby inhibit formation of complexes between the trace elements and other components such as, for example, sulfates. Humic acid can additionally be utilized as a source of carbon during seed germination and plant growth.

Fulvic acid can be utilized to achieve a desired pH of the composition. Compositions according to the present invention are not limited to a particular pH, can preferably comprise an acidic pH, and more preferably have a pH between about 5.3 and about 6.8. A pH in the range of from about 5.3 to about 6.8 can be beneficial since this pH range can inhibit complex formation between trace elements and other components such as sulfates. It can be advantageous to utilize fulvic acid to adjust the pH since fulvic acid can additionally be utilized as a carbon source. It is to be understood, however, that the invention contemplates utilization of alternative or additional agents for adjusting pH of the composition.

Compositions of the present invention are preferably formulated in the form of an aqueous solution. The amount of added water utilized in composition formation will depend upon the particular components and whether the components are in a dry form, in a liquid form or in solution when added to the formulation.

It is to be understood that the specific amount of each component indicated in the table is within a preferred range for the specific material utilized in the embodiment. When the sources listed are utilized for producing the composition, the amount indicated is the amount most preferred and is within a preferred range that includes a deviation of up to about +/−25% from the specified amount.

Preparation of Compositions According to the Present Invention is not Limited to any specific order of addition of components. In particular aspects it can be preferable to form an initial mixture. Preferably, micronutrients are added individually, however, the order of their addition can be arbitrary. After formation of the initial mixture, the remaining components can be added. Mixing is preferably continued throughout the addition of components.

For example, current methods of treating seeds include encapsulating seeds with a coating to form a seed "capsule". The seed capsule can be formed primarily to provide a uniform seed size, shape or both. Encapsulation can be advantageous to produce a smoother and or rounder shape which can assist in the passing of the seed through various seed processing and planting equipment. Compositions of the present invention can be added to materials used for encapsulation and the combined mixture can be used for simultaneous treatment and encapsulation of seeds. Alternatively, seed treatment of the present invention can be applied to seed independently of the encapsulation material, preferably prior to encapsulation.

Optionally, a storage step can be included whereby the treated seed is stored prior to planting. In particular instances it can be advantageous to store treated seed prior to planting. Germination rates of seed can vary depending upon the length of time a seed has been stored between harvesting of the seed and subsequent planting of the seed. For purposes of the present description the term "germination rate" refers to the percent of a seed population that germinates. Various types of seed can have different optimal storage periods for maximization of the germination rate of the seed. As an example, seed such as wheat achieves an optimal germination rate about two growth seasons after seed harvest. In other words, if the wheat is harvested in the fall of year one and the harvested seed is planted in the fall of year two or spring of year three, the germination rate will be higher than if the seed was planted earlier. Additionally, the planting period to achieve optimal germination rates are often brief, with germination rates declining with increased storage time beyond the optimal year. Therefore, it can be beneficial to store the seed and plant the seed within the optimal period to maximize germination rates.

Optimal planting time for maximization of seed germination rate will vary based upon specific seed type. Additionally, certain seeds such as cereal grains have intrinsically high germination rates relative to other seed types. Accordingly, for some seed types it can be preferable to store the seed through one or more growing seasons prior to planting based on the optimal planting period for the particular seed.

According to the present invention, the seeds are substantially uniformly coated with one or more of the aforementioned layers of compositions using conventional methods of mixing, spraying or a combination thereof. Various coating machines are available which may utilize various coating technology through the use of rotary coaters, drum coaters, fluidized bed techniques, spoutedbeds or a combination thereof.

The seeds may be coated via a batch or continuous coating process. In one embodiment, uncoated seeds enter the coating machine in a steady stream to replace coated product that has exited the machine. Additionally, a computer system may monitor the seed input to the coating machine, thereby maintaining a constant flow of the appropriate amount of seed. In an alternative embodiment, the seed coating machinery can optionally be operated by a programmable logic controller that allows various equipment to be started and stopped without employee intervention. The components of this system are commercially available through several sources.

In one embodiment, seeds are first separated by mechanical means such as a sieve. The separated small seeds are then introduced into a coating machine via an infeed chute that allows for precision metering of incoming seeds. After passing through the infeed chute, the seed enters a mixing bowl. In one embodiment, the mixing bowl is one or more cylinders with a rotating base. One or more coating compositions are then introduced to the mixing bowl via a powder feeder and/or solution pumps. In one embodiment, the powder feeder applies the one or more coating compositions to the seeds as the seed mass rotates in the mixing bowl. In a preferred embodiment, the seeds are combined with one or more of the coating compositions and adhered with the binder within a mixing bowl. Either the operator or a computer system may verify and coordinate any batching, mixing, and pumping of the solutions containing one or more of the coating layer compositions.

In one embodiment of the process, all three layer compositions are sequentially added. Preferably, the base layer comprising a polyvinyl alcohol and sucrose binder as well as a pumice are added to the mixing bowl containing one or more seeds. The intermediate and outer compositions are then introduced sequentially to the rotating drum. The intermediate composition preferably comprises talc or mica while the outer layer preferably comprises graphite alone or in combination with a magnesium silicate such as talc. In one embodiment, the seeds are polished by retaining the seeds in the mixing bowl for an extended period of time resulting in an improved appearance.

After application of one or more of the layers described herein, the seed exits the mixing bowl and is moved to a drying apparatus where the seed is dried. In one embodiment, the dried seeds are transferred back to the infeed chute for subsequent coating. Preferably, the size variation among seeds presented to the purchaser is less than about 15% and more preferably less than about 5%.

Seed coating or pelleting methods within the present invention involve the use of a rotary seed coater; however, other seed coating devices such as coating pans or tumbling drums, fluidized bed techniques, and agglomerators may also be used. Coating is performed within the rotary coater by placing seeds within a coating chamber (mixing bowl), of which the bottom rotates creating centrifugal forces and therefore pushing the seed upward and outward against the inside wall of the chamber. Centrifugal forces and mixing bars placed inside the coater cause the seed to rotate and mix. Adhesive (binder) or other liquid seed coating materials are pumped into the center of the coater onto an atomizer disk that rotates in the opposite direction of the bottom of the coating chamber. Upon hitting the atomizer disk, liquid adhesive is then directed outward in small drops onto the seed. A feeder then applies powder onto the seed to prevent seeds from attaching to one another and allowing for increased buildup of the coating material.

Methods for applying nonionic wetting agent to the seed comprise first coating seed with a plant protectant consisting of a powder coating attached to the seed with adhesive (binder), to physically separate the active ingredient (i.e. wetting agent) from contact with the seed surface until germination. There may also be several powders adequate for use as a seed protectant, such as diatomaceous earth, gypsum, chalk, clays, perlite, talc, quartz or a combination of powders. There are several binders that may be utilized for this invention. This technique of applying a seed protectant is typically known as pellet loading. While it is not necessary that this step be performed, application can help prevent germination delay and increase seed storage life by improving seed respiration.

To further increase seed moisture availability super hydrating polymers (SHP's) can be added to the powder used for the seed protectant. SHP's can be added at commercial supplier recommended rates and several times higher due the synergistic effects with soil wetting agent which is applied latter in the coating process.

Figure 2:
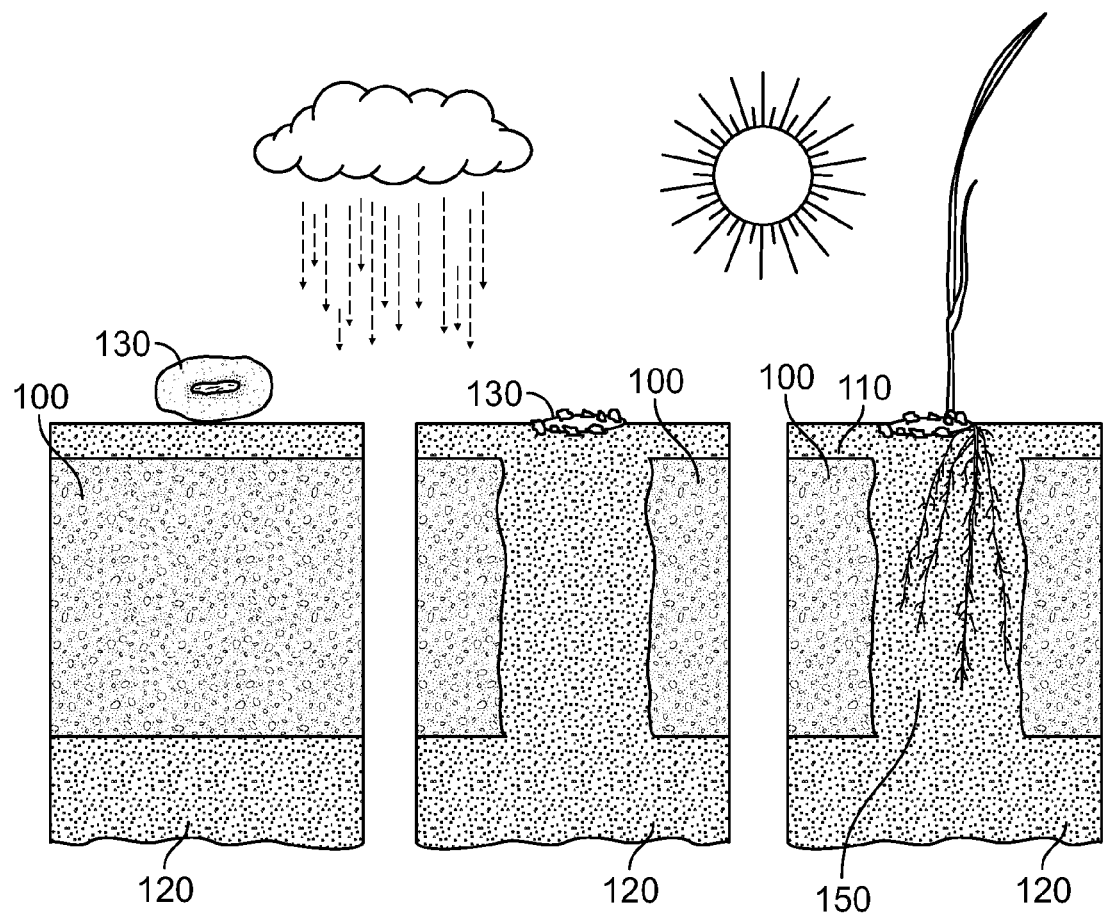
FIG. 2 shows a cross-section of a seed[1] capsule and a soil profile. a cross-section of a seed that is coated with soil surfactant particles and a soil profile, and a cross-section of a seed from a single capsule that has germinated and a soil profile, from left to right.
Figure 3A:
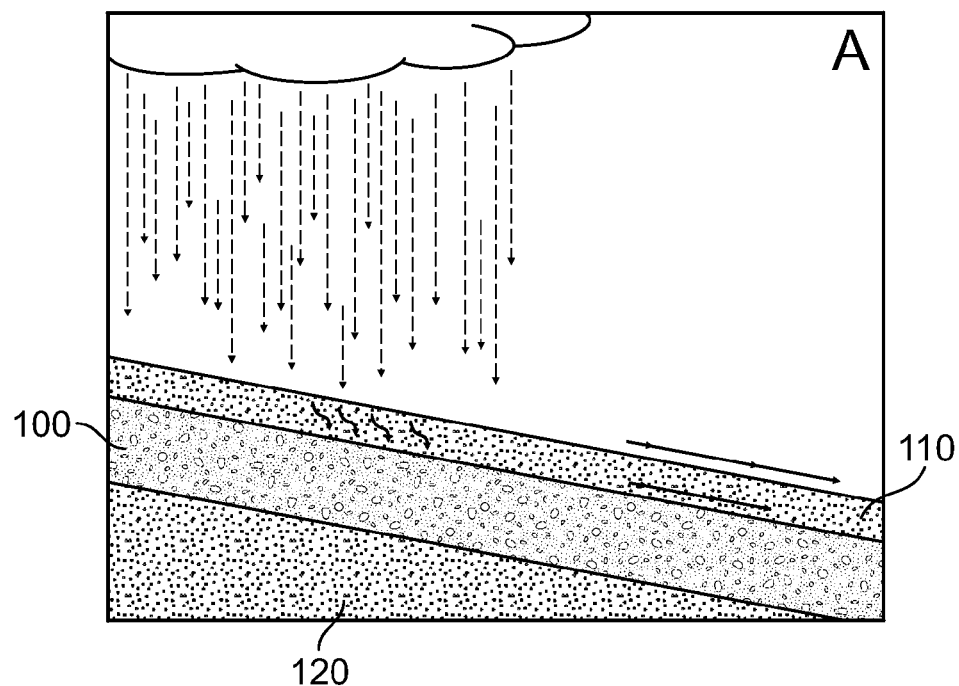
FIG. 3A shows a soil profile without germinated seeds. The water-repellent layer has impeded infiltration of precipitation. The upper wettable soil layer is now saturated.
Figure 3B:
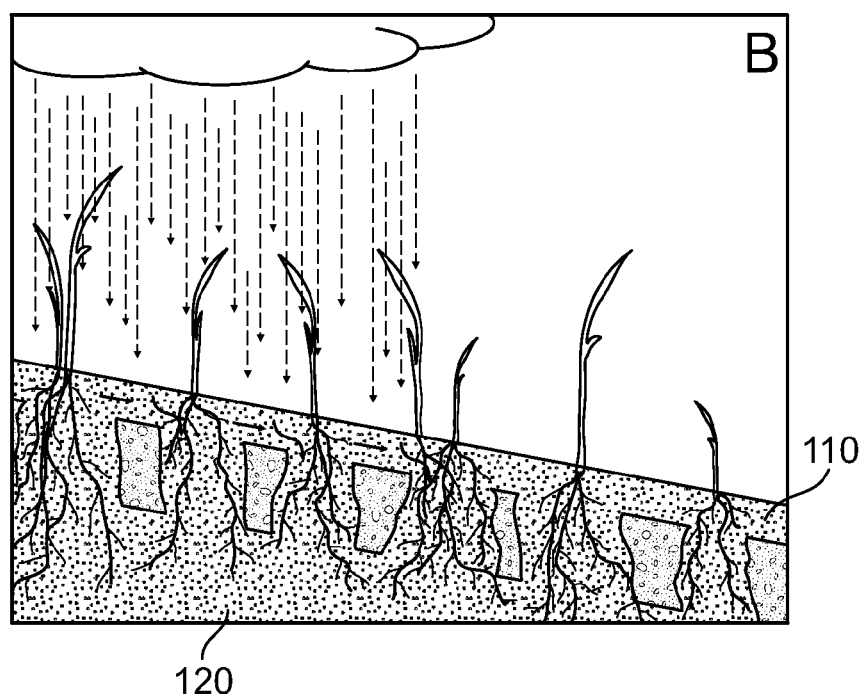
FIG. 3B. shows a soil profile with seeds from embodiments of the invention that have germinated and penetrated the water-repellent layer, i.e., soil that has been treated with seed capsules and/or conglomerate seed capsules. The soil surfactants in the seed capsules and/or the conglomerate seed capsules have created a hydrophilic conduit around the roots and the roots have penetrated through the water-repellent layer.
Figure 5:
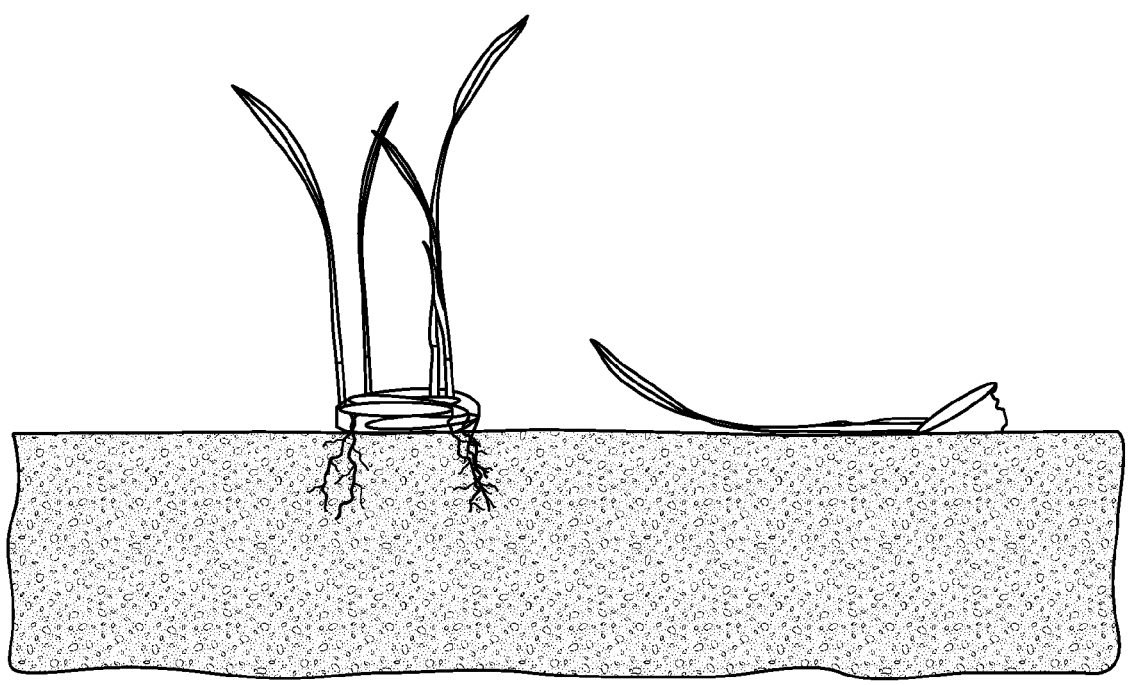
FIG. 5 shows on the left side some upright seedlings that germinated from the seeds that were in a conglomerate seed capsule and on the right side a fallen seedling that germinated from a single seed that was in a seed capsule.
Figure 6:
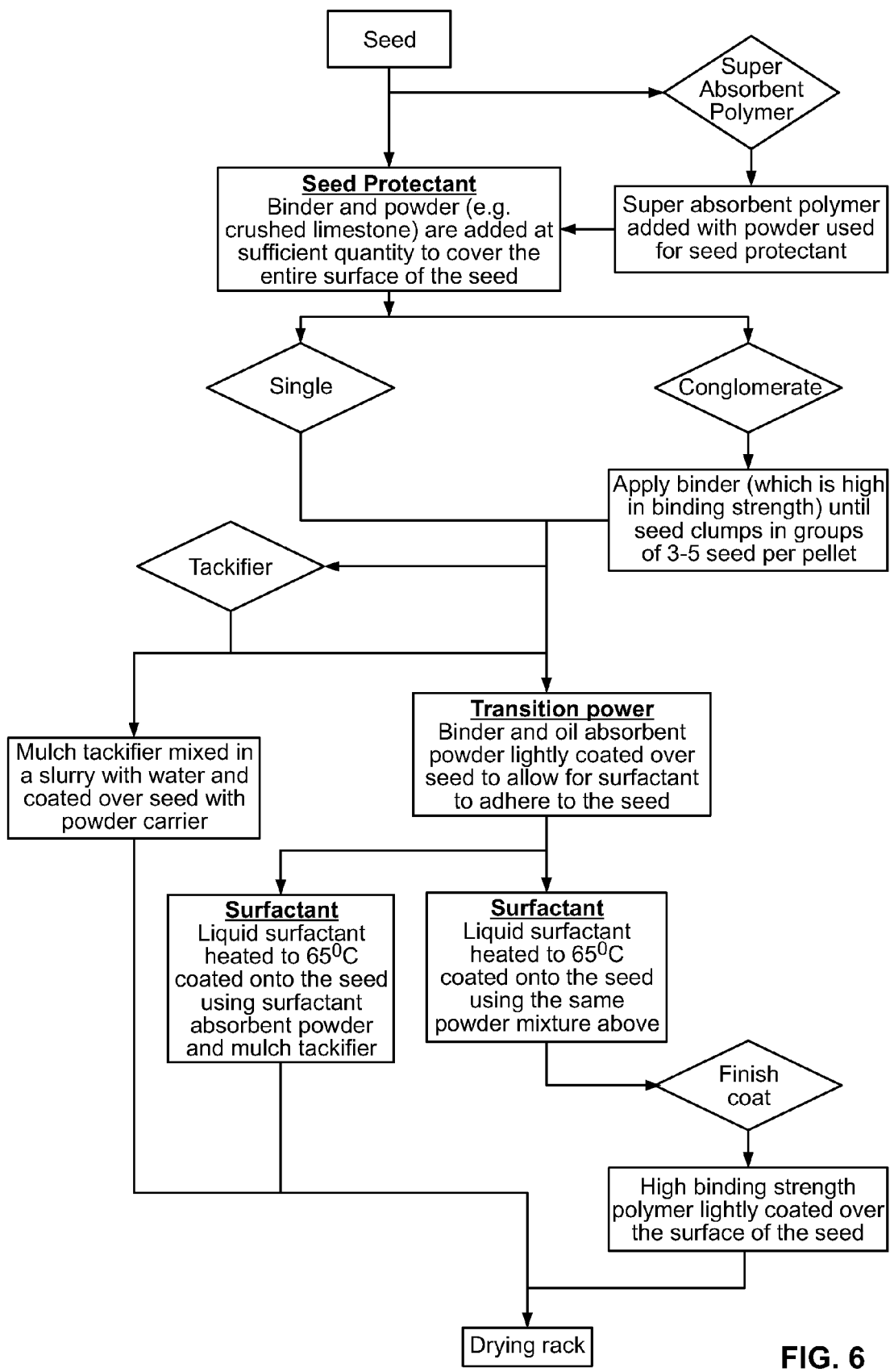
FIG. 6 shows a schematic representative flow diagram illustrating multiple manufacturing processes for producing seed capsules and conglomerate seed capsules.

Referring to FIG. 2, on the left, there is shown a capsule that is coated with super-hydrating polymers and a wetting agent. The seed capsule is located above a water-repellent layer of soil. In the middle, there is shown a seed capsule that has released soil surfactants into the soil after precipitation has occurred. The soil surfactants have formed a hydrophilic conduit. On the right, there is shown a seedling that has emerged from the seed of the seed capsule after the seed has germinated. The roots have penetrated the water-repellent layer. The super-hydrating polymers, which are optionally found in embodiments of the invention, have retained water from previous precipitation events for seed germination and seedling growth.

It is the primary intention of this invention to provide methods for coating nonionic soil wetting agents; however, methods also can be applied for other wetting agent types such as ionic wetting agents, and amphiphilic wetting agents.

Prior to coating wetting agent onto the seed a powder and binder are lightly coated over the outside of the seed protectant coat. This step is noted in the flow diagram as "transition powder" which consists of a blend containing the oil absorbent material such as powdered (Oil-Dri Corporation of America, Alpharetta, Ga.) and powdered limestone or other powder carrier. The oil absorbent −325 RVM (or, alternatively, sorbent mineral powders such as montmorillonite, attapulgite or diatomite) is used in this invention because of its high absorbent properties for soil wetting agent; however, other powders could be used in place of −325 RVM (or, alternatively, sorbent mineral powders such as montmorillonite, attapulgite or diatomite). By attaching the high absorbent powder to the seed the ability of the wetting agent to adhere to the seed is improved.

Wetting agent is delivered to the seed through direct injection onto the atomizer disk, while the same mix used for the transition powder is applied to the seed. wetting agent- Prior to application, the liquid wetting agent is heated and maintained around 55 C. By heating the wetting agent the viscosity of the liquid is lowered which improves seed coatability, minimizes clumping, and decreases the formation of "dead balls" (i.e. pellets formed during the coating process that do not contain seed). Amount of wetting agent seed coating will depend on the severity of soil water repellency within the soil.

Powder used to coat soil wetting agent onto the seed is the same as that used in the transition powder, previously explained above. Due to the tackiness of the soil wetting agent, adhesive binders are not required in this part of the coating process. During the coating process it is important that moisture of the seed coat be maintained at optimal rates; if the seed coating becomes too saturated with wetting agent, seeds will begin to clump together and or the seed coating will fall off of the seed. If denser coated seeds are desired the ratio of lime or other powder to oil absorbent can be increased. The density of the seed coating is increased because; 1) more powder is required to absorb the same amount of soil wetting agent, and 2) increased use of powders such as lime that are significantly denser than oil absorbent will increase coat density.

While not necessary to the invention, upon completion of the pellet a film coat can be added to enhance pellet structure and minimize "dusting off" issues through the loss of coating material during transportation and delivery. After final seed treatment application, the coated seed can be placed on a drying rack, and dried with or without heat.

Mulch tackifiers can also be incorporated into seed coatings to increase seed retention through anchoring the seeds to the soil, and when applied in combination with wetting agents, to further enhance moisture availability and duration. When applied without wetting agent, a slurry of a psyllium tackifier is applied to seed within the coating machine by direct injection onto the atomizing disk while tackifier powder or other carrier (such as powdered limestone) is added on top of the seed to aid in solidification of the coating. To further increase structure of the seed coat, upon addition of the tackifier amendments, the seed is left spinning without addition of amendments for an additional 1.5 min to compact amendments around the seed.

When applied with wetting agent, psyllium tackifier is applied in powder form on top of the seeds as liquid wetting agent is added as described above. Mixing psyllium tackifier powder with an oil absorbent can increase the ratio of wetting agent to powder where higher rates of wetting agent application are desired. Use of a psyllium tackifier powder in combination with an oil absorbent to apply wetting agent can result in a less dense seed coating than when wetting agent is applied with oil absorbent and other powders (such as powdered limestone). This can be advantageous where end weight of the coated seed may influence its utility, as in aerial seeding efforts.

Seed coating treatments previously explained can also be applied to agglomerations of seeds (i.e. multiple seeds grouped together within the same pellet). Prior to agglomeration a seed protectant is applied as explained previously. To group the seeds together an adhesive is applied to the seed via injection onto the atomizing disk. During the period in which adhesive is applied, powder is withheld, resulting in the grouping of the seeds, with agglomeration size primarily dependent upon adhesive rate and period of time powder is withheld. Once the desired agglomeration size has been reached binder is withheld and a burst of hydrophilic powder (such as limestone) is applied, thus stopping the seeds from further agglomerating, resulting in seed batches containing similarly sized pellets comprised of multiple seeds. Target agglomerate pellet size should depend on application. For example if soil physical crust was limiting seedling emergence, agglomerate pellet size should contain enough seeds to facilitate seedling emergence, but be small enough to facilitate planting. Based off of the research conducted with grass seed, we recommend agglomerates containing around 10 or fewer seeds per pellet. Beyond this rate pellet sizes would be difficult to plant with conventional seeding equipment, or, if aerially seeded, large pellet sizes will result in a significant portion of the seeds being elevated above the soil surface, resulting in decreased moisture resources for those seeds at the top of the pellet.

Once seeds have been agglomerated together, the desired amendments such as soil wetting agents and tackifiers can be applied by the same processes described previously. If such amendments are not desired, seed weight/coating thickness can be increased around the agglomerates by applying binder and coating powders.

Example 1

Wetting Agent Seed Coating

The grass species evaluated included bottlebrush squirreltail (*Elymus elymoides* (Raf.) Swezey) and crested wheatgrass (*Agropyron cristatum* L. Gaertn.). Seeds were coated using a RP14MAN seed coater (BraceWorks Automation and Electric, Lloydminster, SK Canada). Seeds were coated first with a plant protectant, which consisted of 88% weight of seed to weight of product ratio (w/w) crushed limestone (size less than 200 mesh, with the bulk smaller than 300 mesh) attached to the seed with 21% w/w binder consisting of 3 parts water and 1 part polymer 100© (Germains Technology Group (Gilroy, Calif.).

To aid in the attachment of soil wetting agent, transition powder consisting of a blend containing about 5.1% w/w oil absorbent −325 RVM (Oil-Dri Corporation of America, Alpharetta, Ga.) (or, alternatively, sorbent mineral powders such as montmorillonite, attapulgite or diatomite) and 2.8% w/w powdered limestone, was attached with the above binder at 1.9% w/w for a total of 9.8% w/w increase. Soil wetting agent used was a concentrated nonionic blend comprised of a of alkylpolyglycoside (APG) and ethylene oxide/propylene oxide (EO/PO) block copolymers, developed by Aquatrols Corp. Prior to application, wetting agent was heated and maintained at 55 degrees C. during the coating process. Wetting agent was applied at 240% w/w, through injection onto the rotary coater's atomizer disk. During the application of wetting agent, the same powder mixture applied above in the transition powder was added at 485% w/w, through a powder feeder. After final wetting agent application, the coated seeds were placed on a drying rack, and allowed to air dry over night.

Soil was collected from the subcanopy of burned juniper trees (*Juniperus osteosperma* (Torr.) Little). Average water drop penetration time (WDPT) under the subcanopy of burned P-J trees was 1.36±0.19 hrs. The mean depth to the water repellent zone from the soil surface was 1.40±0.12 cm, with a water repellent layer extending beyond this point 4.80±0.51 cm on average. Coated seeds were evaluated against uncoated seeds (control) that were planted in soil cores (20.32 cm diameter by 25.4 cm deep), with 12 seeds per pot, and 3 replicates per treatment. Because the number of germinable seeds was different between species tested, plant density results are presented after normalizing for germination.

Results of this study indicate that the invention improved ecohydrologic properties required for seed germination and plant survival. In this study the effect of proposed seed coating invention was explicit, with plant density of bottlebrush squirreltail and crested wheatgrass 343% and 733% higher than the control, respectively (Table 1).

TABLE 1

| Species | Treatment | Survival of germinable seeds (%) |
|---|---|---|
| E. elymoides | Control | 19.4 |
| E. elymoides | 240% w/w wetting agent | 85.8 |
| A. cristatum | Control | 7.9 |
| A. cristatum | 240% w/w wetting agent | 66.1 |

Example 2

Rate Analysis and Agglomeration Evaluation

Conglomerate evaluations were performed using crested wheatgrass (*Agropyron cristatum*). Single seed coatings were applied using the same methods previously explained in example 1, with seeds coated with either 96% w/w or 240% w/w wetting agent.

Agglomerations of seeds were formed after application of the plant protectant. Seeds were grouped together using 22% w/w binder consisting of 1 part water and 1 part polymer 300© (Germains Technology Group (Gilroy, Calif.). During the period adhesive was applied, powder was withheld. After application of binder 20% w/w limestone was rapidly added, thus stopping the seeds from further agglomerating together, resulting in seed batches containing pellets around 3-4 seeds. At this point methods used for applying wetting agent to a single seed were employed for application to the agglomerates.

Results indicated that seeds coated with 96% w/w wetting agent showed a 348% increase in seedling density over the control. Seeds coated with 240% w/w wetting agent were 33% higher than the seeds treated with 96% w/w wetting agent. Interestingly seeds agglomerated together showed a 75% increase over single seeds, which we attribute to improved plant growth of seedling radical and cotyledons. Treatment of agglomerated seeds with wetting agent showed the greatest increase in seedling survival with a 87% over non-coated single seeds. We speculate that the results between treated seeds and uncoated seeds are not as dramatic as Example 1 because of differences in the length of the study. Data for example 1 shows seedling density 6 weeks after planting, while example 2 is only 2.5 weeks after planting. Research indicates that the differences between the wetting agent treated and uncoated seeds will increase.

TABLE 2

| | Survival of germinable seeds (%) | |
|---|---|---|
| Treatment | single seeds | Agglomerates |
| control | 6.2 | 24.7 |
| 96% w/w wetting agent | 27.8 | not tested |
| 240% w/w wetting agent | 37.0 | 46.3 |

Example 3

Mulch Tackifiers and Agglomeration

Conglomerate evaluations were performed using crested wheatgrass (*Agropyron cristatum*). Agglomerations were formed using 35% w/w polymer 300© (Germains Technology Group (Gilroy, Calif.) at a ratio of 1 part polymer 300 to 1 part water. A psyllium tackifier, Ecology Controls M-Binder (S&S Seeds, Inc. Carpinteria, Calif.) was coated onto seed agglomerations in slurry form consisting of 10.8% w/w Ecology Controls M-Binder powder and 90.2% w/w water. Powdered limestone was added simultaneously with the slurry to provide a surface for the slurry to adhere to and facilitate coating of a greater amount of the tackifier. Approximately 1.83 g of lime was added per gram of slurry (62% w/w slurry, 114% w/w lime).

TABLE 3

| Treatment | Survival of germinable seeds (%) |
|---|---|
| control | 27.8 |
| psyllium tackifier conglomerate | 111.1 |

What is claimed is:

1. A seed composition for conditioning soil, the composition comprising;
   at least one seed;
   at least one seed protective coating that comprises a binder and a first powdered carrier, and is adhered to an outside surface of the seed; and
   a surfactant coating that is disposed on the seed protective coating and that comprises at least one soil surfactant and a second powdered carrier,
   wherein the first powdered carrier is a germination delay preventer,
   wherein the seed protective coating is disposed between the seed and the soil surfactant coating to substantially prevent the soil surfactant from contacting the seed, and
   wherein the soil surfactant is released from the second powdered carrier into the soil upon contact with water, thereby improving moisture availability to an area of soil around the seed.

2. The seed composition of claim 1, wherein the soil surfactant is a nonionic surfactant.

3. The seed composition of claim 2, wherein the nonionic surfactant is at least one nonionic surfactant selected from the group consisting of: a copolymer, a block copolymer, an alcohol ethoxylate, a nonylphenol ethoxylate, an ethylene oxide/propylene oxide block copolymer, and an alkylpolyglycoside.

4. The seed composition of claim 1, further comprising at least one soil amendment or plant amendment disposed within the surfactant coating and selected from the group consisting of: 2-butoxyethanol, an alkylpolyglycoside, an amino acid, ammonium laureth sulfate, a bio-stimulant, a block co-polymer, a blended non-ionic surfactant, a blended ionic surfactant, an enzyme, ethylene oxide/propylene oxide, a fermentation product, fulvic acid, a granular soil surfactant, a hormone, humic acid, a liquid soil surfactant, a microorganism, nonylphenolpolyethoxylate, a nontoxic ingredient, a non-ionic surfactant, a nutrient, oleic acid, a surfactant, a soil conditioner, a soil microbe, a microbial innoculant, a stimulant that is beneficial to microbial growth, a soil surfactant, a super-hydrating soil surfactant, a tackifier, a turf soil surfactant, a penetrant, poloxanlene, a re-soil surfactant, a root stimulant, a spreader, a vitamin, an agrichemical seed treatment, a fungicide, an insecticide, a plant protectant, and an absorbent polymer.

5. The seed composition of claim 4, further comprising a third powder carrier for the at least one soil amendment or plant amendment, wherein the third powder carrier is at least one selected from the group consisting of: a transition powder, a blend of montmorillonite, an oil absorbent, a blend containing about 65% of −325 RVM and about 35% powdered limestone or other powder carrier by volume, a montmorillonite clay, potato starch, a molecular sieve, diatomaceous earth, talc, mica, lime, and bentonite.

6. The seed composition of claim 1,
wherein the seed composition is an agglomerate of more than one seed, and
wherein the soil surfactant is at least one soil surfactant selected from the group consisting of: an ionic surfactant, an amphiphilic surfactant, and a surfactant with an HLB value that is in a range of greater than 2 and less than 18.

7. The seed composition of claim 1, further comprising:
a tackifier coating disposed on the surfactant coating,
wherein the tackifier coating is at least one selected from the group consisting of:
a mulch tackifier, a slurry tackifier, and a psyllium tackifier.

8. The seed composition of claim 7,
wherein the at least one seed is more than one and less than fifty seeds.

9. The seed composition of claim 1, wherein the first powdered carrier comprises at least one selected from the group consisting of: diatomaceous earth, gypsum, chalk, clays, perlite, talc, quartz, limestone, pumice and a super hydrating polymer.

10. The seed composition of claim 1, wherein the surfactant coating is present in a range between 3% and 2500% of the wet weight of the associated seed.

* * * * *

UNITED STATES PATENT AND TRADEMARK OFFICE
CERTIFICATE OF CORRECTION

| | | |
|---|---|---|
| PATENT NO. | : 9,554,502 B2 | Page 1 of 1 |
| APPLICATION NO. | : 12/730182 | |
| DATED | : January 31, 2017 | |
| INVENTOR(S) | : Madsen et al. | |

It is certified that error appears in the above-identified patent and that said Letters Patent is hereby corrected as shown below:

In the Specification

Please delete the current paragraph at Column 1, Line 15 through 23 which reads as follows:
"Statement Regarding Federal Funding
The U.S. Government has a paid-up license in this invention and the right in limited circumstances to require the patent owner to license others on reasonable terms as provided for by the terms of (contract No. or Grant No.) awarded by (Agency)."

Column 1, Line 14; In its place please insert the following paragraph:
-- STATEMENT REGARDING FEDERALLY SPONSORED RESEARCH AND DEVELOPMENT
This invention was made with government support under Grant Number 69-8D43-8-02 awarded by the United States Department of Agriculture. The government has certain rights in the invention. --

Signed and Sealed this
Sixth Day of June, 2017

Michelle K. Lee
*Director of the United States Patent and Trademark Office*